United States Patent [19]

Kuhlthau et al.

[11] 4,211,436
[45] Jul. 8, 1980

[54] PRESSURE-SENSITIVE RECORDING MATERIAL

[75] Inventors: Hans-Peter Kühlthau; Hubertus Psaar; Roderich Raue, all of Leverkusen, Fed. Rep. of Germany

[73] Assignee: Bayer Aktiengesellschaft, Leverkusen, Fed. Rep. of Germany

[21] Appl. No.: 958,609

[22] Filed: Nov. 8, 1978

[30] Foreign Application Priority Data

Nov. 10, 1977 [DE] Fed. Rep. of Germany ....... 2750283

[51] Int. Cl.² .................. B41M 5/16; B41M 5/22
[52] U.S. Cl. .................................... 282/27.5; 106/21; 260/319.1; 260/386; 260/393; 427/150; 427/151; 428/307; 428/914
[58] Field of Search ................ 106/14.5, 21; 282/27.5; 427/150, 151, 152; 428/307, 411, 537, 913, 914; 260/386, 389, 390, 393, 319.1

[56] References Cited

U.S. PATENT DOCUMENTS

| | | | |
|---|---|---|---|
| 3,488,207 | 1/1970 | Vassiliades | 282/27.5 |
| 3,957,288 | 5/1976 | Lemahieu et al. | 428/411 X |
| 3,958,815 | 5/1976 | Poot et al. | 428/411 X |
| 3,995,088 | 11/1976 | Garner et al. | 282/27.5 X |
| 4,054,718 | 10/1977 | Garner et al. | 282/27.5 X |

*Primary Examiner*—Bruce Hess
*Attorney, Agent, or Firm*—Sprung, Felfe, Horn, Lynch & Kramer

[57] ABSTRACT

A pressure-sensitive and heat-sensitive recording material contains color-forming agents of the formula

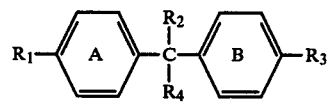

wherein
$R_1$ denotes hydrogen or a non-ionic radical which is free from amino groups,
$R_2$ denotes hydroxyl, alkylamino, dialkylamino, acylamino, aralkylamino, arylamino, a saturated heterocyclic radical, alkoxy, alkenyloxy, aralkoxy, cycloalkoxy, aryloxy, acyloxy or a direct bond to $R_4$,
$R_3$ denotes hydroxyl, alkoxy, aralkoxy, alkenyloxy, cycloalkoxy, aryloxy, alkylthio, arylthio or a radical of the formula

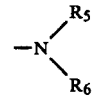

wherein
$R_5$ and $R_6$ independently of one another denote hydrogen, alkyl, aralkyl, cyloalkyl or aryl or, together with the nitrogen atom, form a ring, or $R_5$ forms a ring with the ring B in the o-position relative to the nitrogen atom, and
$R_4$ denotes an aryl radical which is free from amino groups or a heterocyclic radical.

10 Claims, No Drawings

PRESSURE-SENSITIVE RECORDING MATERIAL

The present invention relates to a pressure-sensitive and heat-sensitive recording material which contains colour-forming agents of the formula I

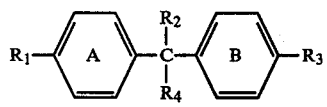

In the formula I: $R_1$ denotes hydrogen or a non-ionic radical which is free from amino groups, $R_2$ denotes hydroxyl, alkylamino, dialkylamino, acylamino, aralkylamino, arylamino, a saturated heterocyclic radical, alkoxy, alkenyloxy, aralkoxy, cycloalkoxy, aryloxy, acyloxy or a direct bond to $R_4$, $R_3$ denotes hydroxyl, alkoxy, aralkoxy, alkenyloxy, cycloalkoxy, aryloxy, alkylthio, arylthio or a radical of the formula

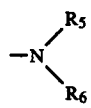

wherein $R_5$ and $R_6$ independently of one another denote hydrogen, alkyl, aralkyl, cycloalkyl or aryl or, together with the nitrogen atom, form a ring, or $R_5$ forms a ring with the ring B in the o-position relative to the nitrogen atom, and $R_4$ denotes an aryl radical which is free from amino groups or a heterocyclic radical denotes. Further rings can be fused to the rings A, B and $R_4$. The cyclic and acyclic radicals and the rings A and B can contain non-ionic substituents.

By non-ionic substituents there are to be understood, in the sense of the present invention, those substituents which are customary in dyestuff chemistry and do not dissociate under the usual preparation and use conditions, such as halogen, for example fluorine, chlorine and bromine, hydroxyl, alkyl groups, alkenyl radicals with preferably 2-4 C atoms, aralkyl, alkoxy or hydroxyalkoxy, cycloalkoxy, aralkoxy, aryloxyalkoxy, alkylthio, aralkylthio, arylthio, nitro, cyano, formyl, alkylcarbonyl, arylcarbonyloxy, alkylcarbonyloxy, alkoxycarbonyloxy, alkylcarbonylamino, alkylaminocarbonyloxy, alkylsulphonylamino, ureido, N-alkylureido, aryloxycarbonylamino, alkoxycarbonylamino, carbamoyl, N-alkylcarbamoyl, N,N-dialkylcarbamoyl, N-alkyl-N-aryl-carbamoyl, sulphamoyl, N-alkylsulphamoyl, N,N-dialkylsulphamoyl, alkylsulphonyl, alkenylsulphonyl, arylsulphonyl, aralkylsulphonyl, aryloxysulphonyl, aryloxycarbonyl, alkoxycarbonyl, mono- di- or trialkylsulphamidine, alkylarylsulphamidine or alkylcycloalkylsulphamidine, preferably 1–4 C atoms being present in the alkyl radicals mentioned. Preferred aryl is phenyl, preferred aralkyl is benzyl and preferred cycloalkyl is cyclohexyl.

The alkyl radicals mentioned in the case of formula (I) are in general those with 1–6 C atoms. The alkyl radicals mentioned under $R_2$ can have up to 12 C atoms. Examples of non-ionic substituents of the alkyl radicals are halogen, hydroxyl, $C_1$–$C_4$-alkoxy, phenyloxy, benzyloxy, $C_1$–$C_4$-alkylcarbonyloxy, $C_1$–$C_4$-alkoxycarbonyl, amidocarbonyl or cyano.

Examples of preferred alkenyl radicals are $C_2$–$C_5$-alkenyl radicals.

Aryl is preferably understood as phenyl or naphthyl and aralkyl is understood as benzyl and β-phenyl-$C_1$–$C_4$-alkyl. The phenyl rings can be substituted by, for example, 1–4 non-ionic radicals, such as halogen, $C_1$–$C_4$-alkyl, $C_1$–$C_4$-alkoxy, $C_1$–$C_4$-alkoxycarbonyl, amidocarbonyl, cyano, amidosulphonyl, $C_1$–$C_3$-alkylcarbonylamino or benzoylamino.

Cycloalkyl represents, in particular, cyclopentyl and cyclohexyl, which can be substituted, for example, by 1–4 non-ionic radicals, in particular methyl.

Acyl preferably represents acetyl, propionyl, benzoyl, toluyl, $C_1$–$C_2$-alkylsulphonyl or phenylsulphonyl.

Examples of saturated heterocyclic radicals $R_2$ are, for example, morpholino, piperidino and pyrrolidino.

Examples of suitable heterocyclic radicals $R_4$ are the indole, triazole, furane, thiophene, pyridine, pyrazolone, thiazine, oxazine, benzothiophene, indazole, benzothiazole, quinoline, phenothiazine and phenoxazine radical.

$R_5$ and $R_6$, together with the nitrogen atom, can form, for example, a 5-membered or 6-membered heterocyclic ring, such as pyrrolidine, pyrazoline, piperidine or morpholine. $R_5$, together with ring B, can form, for example, an indoline or tetrahydroquinoline ring. The above-mentioned rings can be substituted by methyl groups or phenyl groups.

The rings A and B can be substituted by 1–4 further non-ionic substituents, such as $C_1$–$C_4$-alkyl, $C_1$–$C_4$-alkoxy or halogen, in addition to the radicals $R_1$ and $R_3$.

By halogen there is understood, in particular, fluorine, chlorine and bromine.

A possible ring to which A and B can be fused is, in particular, the benzene ring.

In formula (I), $R_3$ preferably represents

when $R_4$ denotes aryl.

Preferred colour-forming agents of the formula (I) correspond to the formula

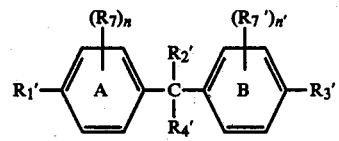

wherein $R_1{'}$ denotes hydrogen; hydroxyl; $C_1$–$C_6$-alkoxy; $C_2$–$C_6$-alkenyloxy; cyclohexyloxy; cyclopentyloxy; benzyloxy, phenylethoxy, phenyloxy, naphthyloxy, phenylthio or naphthylthio which are optionally substituted by $C_1$–$C_4$-alkyl, $C_1$–$C_4$-alkoxy or halogen; or $C_1$–$C_6$-alkylthio, $R_2{'}$ denotes hydroxyl; $C_1$–$C_{12}$-alkyl- or dialkylamino; $C_1$–$C_4$-alkylcarbonylamino; benzylamino phenylethylamino, phenylamino, naphthylamino, phenylsulphonylamino or benzoylamino which are optionally substituted by $C_1$–$C_4$-alkyl, $C_1$–$C_4$-alkoxy or halogen; morpholino, piperidino or pyrrolidino which are optionally substituted by $C_1$–$C_4$-alkyl; $C_1$–$C_{12}$-alkoxy; $C_2$–$C_{12}$-alkenyloxy; $C_1$–$C_4$-alkoxycarbonyloxy; benzyloxy, phenylethoxy, phenyloxy, naphthyloxy, benzoyloxy, phenylsulphonyloxy or phenylsulphinyloxy which are optionally substituted by $C_1$-$C_4$-alkyl, $C_1$-$C_4$-alkoxy or halogen; cyclohexyloxy; cyclopentyloxy or a direct bond to $R_4'$, $R_3'$ denotes hydroxyl; $C_1$-$C_6$-alkoxy; $C_2$-$C_6$-alkenyloxy, cyclohexyloxy; cyclopentyloxy; benzyloxy, phenylethoxy, phenyloxy, naphthyloxy, phenylthio or naphthylthio which are optionally substituted by $C_1$-$C_4$-alkyl, $C_1$-$C_4$-alkoxy or halogen; $C_1$-$C_6$-alkylthio or a radical of the formula

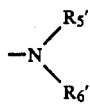

$R_5'$ and $R_6'$ independently of one another denote hydrogen; $C_1$-$C_6$-alkyl which is optionally substituted by $C_1$-$C_4$-alkoxy, $C_1$-$C_4$-alkylcarbonyloxy, hydroxyl, halogen or cyano; benzyl, phenylethyl, phenyl or naphthyl which are optionally substituted by $C_1$-$C_4$-alkyl, $C_1$-$C_4$-alkoxy or halogen; cyclopentyl or cyclohexyl, or $R_5'$ and $R_6'$, together with the nitrogen atom, denote a pyrrolidine, pyrazoline, piperidine or morpholine ring, or $R_5'$, together with the nitrogen atom and ring B, denotes an indoline or tetrahydroquinoline ring, it being possible for the rings mentioned to be substituted by methyl or phenyl, $R_4'$ denotes a radical of the formula

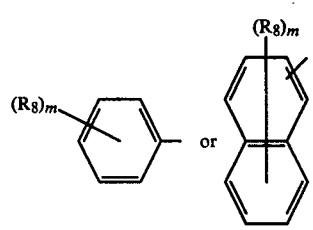

in which
m=1–4 and
$R_8$=hydrogen, $C_1$-$C_4$-alkyl or $C_1$-$C_4$-alkoxy; halogen; carboxamide, sulphonamide; cyano; nitro; halogen; $C_1$-$C_4$-alkylthio; $C_1$-$C_4$-alkylsulphonyl; $C_1$-$C_4$-alkylcarbonyl; $C_1$-$C_4$-alkoxycarbonyl; or benzyl, phenylethyl, benzyloxy, phenylethoxy, phenyloxy, cyclopentyloxy, cyclohexyloxy, phenylthio, benzylsulphonyl, phenylethylsulphonyl or phenylsulphonyl which are optionally substituted by $C_1$-$C_4$-alkyl, $C_1$-$C_4$-alkoxy or halogen, or $R_4'$ denotes an indole, triazole, furane, thiophene, pyridine, pyrazolone, thiazine, oxazine, benzothiophene, indazole, benzothiazole, quinoline, phenothiazine and phenoxazine radical, which in turn can be substituted by 1–2 radicals, such as $C_1$-$C_6$-alkyl, phenyl, benzyl or $C_1$-$C_4$-alkoxy which are optionally substituted by $C_1$-$C_4$-alkoxy, cyano or halogen, $R_7$ and $R_7'$ denote hydrogen, $C_1$-$C_4$-alkyl, $C_1$-$C_4$-alkoxy, halogen or nitro and n and n' denote 1–4, and
wherein the rings A and B can be fused, in the 2,3-position, to a benzene ring. Of the colour-forming agents of the formula II, those of the formula

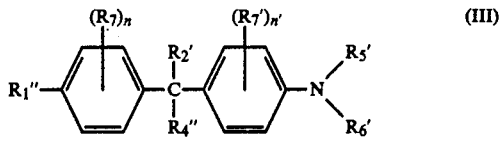

wherein
$R_1''$ represents hydroxyl; $C_1$-$C_4$-alkoxy; $C_1$-$C_4$-alkylthio; cyclohexyloxy; cyclopentyloxy; or benzyloxy, phenylethoxy, phenyloxy, naphthyloxy, phenylthio or naphthylthio which are optionally substituted by $C_1$-$C_4$-alkyl, $C_1$-$C_4$-alkoxy or halogen, $R_4''$ represents a radical of the formula

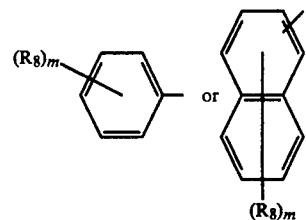

and
the remaining symbols have the meaning as in the case of formula II, are of importance.

Of these colour-forming agents, those of the formula

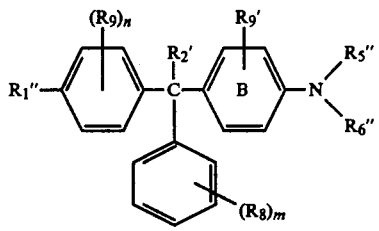

wherein
$R_5''$ and $R_6''$ independently of one another denotes hydrogen; $C_1$-$C_4$-alkyl; cyanoethyl; hydroxyethyl; acetoxyethyl; $C_1$-$C_4$-alkoxyethyl; or benzyl or phenyl which are optionally substituted by methyl, ethyl, methoxy or ethoxy, or $R_5''$ and $R_6''$, together with the nitrogen atom, form a pyrrolidine, piperidine, morpholine, pyrazoline or piperazine ring which is optionally substituted by methyl and/or phenyl, $R_9$ and $R_9'$ represents hydrogen, methyl, ethyl, methoxy, ethoxy or chlorine, or $R_5''$ and $R_9'$, together with ring B and the nitrogen atom, form an indoline or tetrahydroquinoline ring which is optionally substituted by $C_1$-$C_4$-alkyl, and the remaining symbols have the meaning indicated in the case of formulae II and III, may in turn be mentioned.

In very particularly preferred examples of the formula IV, $R_1''$ represents methoxy or ethoxy.

The colour-forming agents of the formula

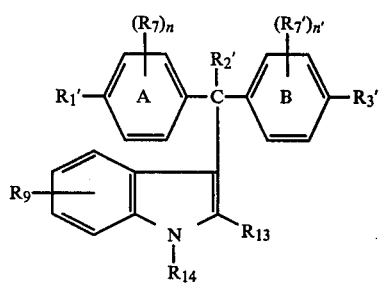

wherein
R$_{13}$ represents C$_1$–C$_4$-alkyl or phenyl and R$_{14}$ represents hydrogen; C$_1$–C$_{22}$-alkyl which is optionally substituted by cyano, chlorine or hydroxyl; C$_2$–C$_4$-alkenyl; cyclohexyl; or phenyl or benzyl which are optionally substituted by methyl, ethyl, methoxy, ethoxy or chlorine, and
wherein
the remaining symbols have the meaning indicated in the case of the formulae II and IV, are likewise of particular importance.

Of these colour-forming agents, those in which the radical R'$_3$ represents the formula

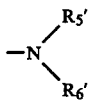

are preferred.

The colour-forming agents of the formula

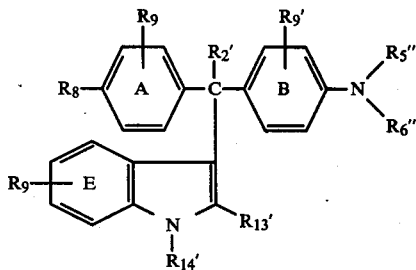

wherein
R$_{13}$' represents methyl, ethyl or phenyl and
R$_{14}$' represents hydrogen or C$_1$–C$_4$-alkyl, and
wherein
the remaining symbols have the meaning as in the case of formulae II and V,
are of very particular interest.

Colour-forming agents of the formula

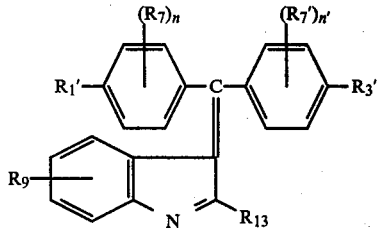

wherein
the symbols have the same meaning as in the case of the formulae II, IV and V, are also valuable.

Colour-forming agents of the formula

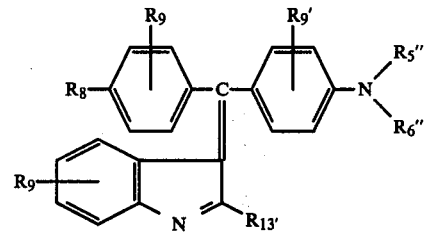

wherein
the symbols have the same meaning as in the case of the formulae II, V and VI, are particularly interesting.

In the most important examples of the formula VI and VIII, R$_8$ represents methyl, hydrogen, phenoxy, benzyloxy, C$_2$–C$_4$-alkoxy or, very particularly preferably, methoxy.

Preferred radicals R$_2$' in the formulae II–VI are hydroxy, —OR$_{10}$,

morpholino, piperidino and pyrrolidino,
wherein
R$_{10}$ denotes C$_1$–C$_{12}$-alkyl, benzyl, phenylethyl, cyclohexyl, pheny, tolyl or benzoyl,
R$_{11}$ denotes hydrogen, methyl or ethyl, and
R$_{12}$ denotes C$_1$–C$_{12}$-alkyl, benzyl, phenyl, tolyl, cyclohexyl, acetyl, benzoyl or phenylsulphonyl.

The carbinol bases and derivatives of the formula I are known, or they can be prepared by known processes. However, they represent a new group of colour-forming agents for pressure-sensitive and heat-sensitive recording materials. The carbinol bases are either synthesised direct or liberated from the corresponding colour salts. Suitable colour salts and processes for their preparation are described, for example, in German Auslegeschriften (German Published Specifications Nos.) 1,569,748, 1,569,751, 1,569,742 and 1,811,337 and German Offenlegungsschriften (German Published Specifications Nos.) 1,811,338, 1,811,651 and 1,811,652. The carbinol base derivatives are obtained by procedures such as are mentioned, for example, in Ber. 33, 3357; Zeitschrift fur Farben and Textilchemie 1, 2; Ber. 37, 2867; J. pr. Chem. (2) 118, 118; Ber. 45, 2918, British Patent Specifications Nos. 788,427, 804,087 and 831,852, U.S. Pat. No. 3,488,207, OS (Published Specification) 2,110,518 and Japanese Patent Publications 7,023,833 and 7,009,621.

If the compounds of the I, which are usually colourless or, in the case of the products VII and VIII, are slightly coloured, are brought into contact with an acid developer, they produce orange-coloured, red, blue or green-grey to black colour shades, which are outstandingly fast to light, with a high speed of development.

They can be used individually or in mixtures, and also advantageously in mixtures with other known colour-forming agents. The practical interest of these new colour-forming agents is based, above all, on the possibility of also obtaining uniform navy blue and black shades.

The colour-forming agents of the formula I are used, according to the invention, in pressure-sensitive or heat-sensitive copying materials or documenting materials in the manner technically customary for other known colour-forming agents.

Thus, for example, a pressure-sensitive recording material consists of a donor sheet which contains, or carries in the form of a layer, at least one colour-forming agent of the formula I, dissolved or dispersed in a non-volatile organic solvent, and a receiving sheet which contains, or carries in the form of a layer, acid developer substances of a known type, which can be, for example, inorganic substances, such as clays, metal salts or metal oxides, or organic polymers, such as phenolic resins.

In order to prevent premature reaction between the colour-forming agents and the developer substance, the two components are separated from one another by customary processes, for example by micro-encapsulating the colour-forming agent solution or dispersion.

Processes for the production of microcapsules of this type, which can be crushed by pressure, are known. The colour-forming agent released, at the point at which pressure is applied, on crushing (for example by writing) produces a coloured image on the receiving sheet.

Examples of suitable non-volatile solvents are partially hydrogenated terphenyl, alkylated naphthalenes or dibutyl phthalate. It is also possible, for example, to incorporate the microcapsules and the acid developer substance in a single sheet or in different layers on a single sheet. In heat-sensitive recording systems, the colour-forming agents of the formula I are appropriately fixed in the customary manner in a binder in solution or in dispersion, which softens or melts under the influence of heat, for example by the action of a laser or a heated pen, so that the colour-forming agents come into contact with the acid developer substance and produce the coloured image.

It is possible to incorporate the binder phase and developer phase either in one layer or in different layers on the recording sheet.

Examples of suitable acid developer substances in this case are also crystalline, low-melting organic acids, in addition to the abovementioned Lewis acids.

The processes and formulations described are known, for example, from U.S. Pat. Nos. 2,948,753, 3,096,189 and 3,193,404 and from German Offenlegungsschriften (German Published Specifications) 2,555,080 and 2,700,937.

EXAMPLE 1

A solution of 100 g of the dyestuff of the formula

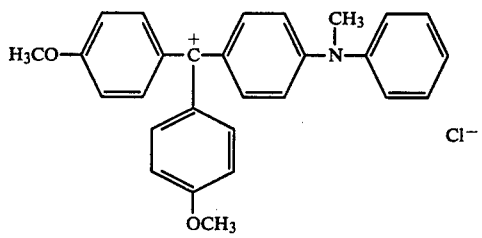

in 250 ml of methanol is allowed to run into a solution of 12.2 g of sodium methylate in 500 ml of methanol at room temperature.

80 g of the carbinol ether of the formula

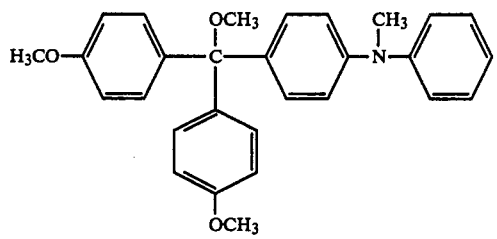

separate out as a yellowish oil. The methanol is separated off from the oily phase and the carbinol ether is dried in vacuo. If a solution of the carbinol ether in ligroin comes into contact with silica gel, the silica gel becomes blue-red in colour.

EXAMPLE 2

A solution of 100 g of the dyestuff of the formula

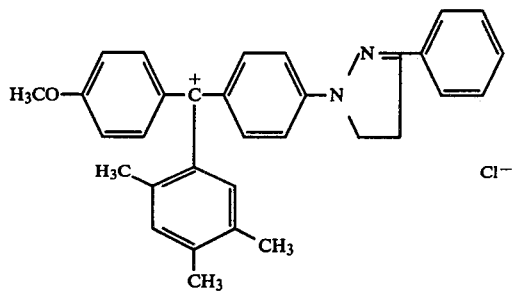

is allowed to run into a solution of 75 g of sodium methylate in 1 liter of methanol. The methyl ether of the formula

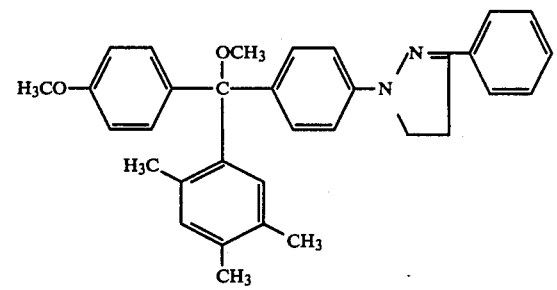

thereby crystallises out. It is filtered off and boiled up with methylcyclohexane, and is thereby obtained as a colourless crystalline powder.

If a solution of the carbinol ether in toluene is brought into contact with silica gel, the silica gel becomes dark blue in colour.

EXAMPLE 3

A melt consisting of 100 g of 4-dimethylamino-4'-methoxybenzophenone, 75.7 g of 2-phenylindole and 175 g of phosphorus oxychloride is kept at 100° C. for 8 hours, the mixture is then diluted with 250 ml of toluene and this solution is stirred into a mixture of 680 g of 45% strength sodium hydroxide solution and 150 ml of toluene. Ice is thereby continuously added in an amount such that a temperature of 60° C. is maintained in the hydrolysis mixture. The mixture is stirred at 60° C. for 2 hours and the organic layer is separated off and washed with hot water. On cooling, the carbinol base of the formula

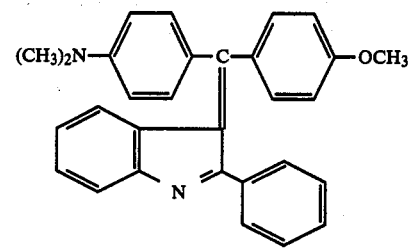

crystallises out. On contact with silica gel, a solution of the base in ligroin produces an intense black coloration.

The colour-forming agents given in the table which follows can be prepared in the manner indicated in Example 1 and 2.

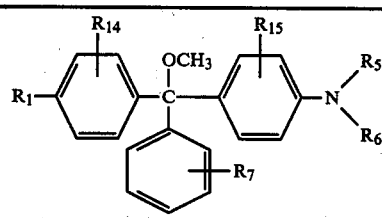

| $R_1$ | $R_7$ | $R_5$ | $R_6$ | $R_{14}$ | $R_{15}$ | Colour shade on contact with silica gel |
|---|---|---|---|---|---|---|
| —$OCH_3$ | 4-$OCH_3$ | —$CH_3$ | —$CH_3$ | —H | —H | red |
| " | —H | —$C_2H_5$ | —$C_2H_5$ | 2-$OCH_3$ | " | " |
| " | " | —$CH_3$ | —$C_2H_4CN$ | —H | " | blue-red |
| " | " | —$C_2H_5$ | —$C_2H_4Cl$ | " | " | " |
| " | " | " | —$CH_2$—$C_6H_5$ | " | " | " |
| " | " | " | —$C_2H_5$ | " | 2-$OCH_3$ | brown-red |
| " | " | —$CH_3$ | —$CH_3$ | " | 3-$CH_3$ | red-blue |
| " | " | —$C_4H_9$ | —$C_2H_4Cl$ | " | —H | violet |
| " | " | —$CH_3$ | —$CH_3$ | " | 2,3-benzo | blue-red |
| " | " | " | —$C_6H_5$ | " | —H | blue-violet |
| —$OCH_3$ | —H | —$CH_3$ | —H | —H | $CH_3$ | red |
| " | " | —CH($C_2H_5$)($CH_3$) | " | " | " | " |
| —$OC_2H_5$ | " | —$C_2H_4CN$ | " | " | $OC_2H_5$ | violet |
| —$OC_6H_5$ | " | —$CH_3$ | p-$C_6H_4$—O—$C_2H_5$ | " | " | " |
| —$OCH_3$ | " | " | —$CH_3$ | 2-$CH_3$ | 2-$CH_3$ | red-violet |
| —$OC_4H_5$ | " | —$C_3H_7$ | —$C_3H_7$ | " | —H | red |
| —$OCH_3$ | 2-Cl | —$CH_3$ | —$C_6H_5$ | —H | " | violet |
| " | 4-Cl | " | —$CH_3$ | " | " | blue-red |
| —$OCH_3$ | 2-$CH_3$ | —$C_4H_9$ | —H | —H | —H | yellow-red |
| —$OC_3H_7$ | —H | —$C_2H_5$ | —$C_2H_5$ | " | 2-$C_2H_5$ | " |
| -o-i-$C_3H_7$ | 2-$CH_3$ | —$CH_3$ | —H | " | $CH_3$ | orange |
| —$OCH_3$ | 3-$CH_3$ | —$C_2H_4CN$ | " | " | 6-$CH_3$ | violet |
| " | 2,4-di-$CH_3$ | " | " | " | —H | red |
| " | 3,4-di-$CH_3$ (—$CH_2$—$C_6H_5$) | —$C_2H_4CN$ | " | 2-$CH_3$ | " | violet |
| " | 2,5-di-$CH_3$ | —$CH_3$ | —$C_6H_5$ | —H | " | " |
| " | 2,4,5-tri-$CH_3$ | —$C_2H_5$ | —$C_2H_5$ | " | " | red |
| —$OCH_3$ | 4-tert-$C_4H_9$ | —$CH_3$ | —$CH_3$ | —H | —H | blue-red |
| " | 2-Cl | " | " | 2-$CH_3$ | " | red |
| " | 2-$CH_3$ | " | " | " | " | " |
| " | 4-Cl | —$C_2H_5$ | —$C_2H_4Cl$ | 2-$OCH_3$ | " | blue-red |
| " | 4-$OC_6H_5$ | —$C_3H_7$ | —$C_3H_7$ | —H | " | " |
| " | 2-$OCH_3$ | —$C_4H_9$ | —$C_4H_9$ | " | " | " |
| " | 4-$OC_2H_5$ | —$CH_3$ | —$C_2H_5$ | " | " | " |
| " | 4-$OC_3H_7$ | —$C_4H_9$ | —$C_4H_9$ | " | " | " |
| " | 2-$OCH_3$ | —$CH_3$ | —$CH_3$ | 3-Cl | " | red |
| " | " | " | " | 2-$CH_3$ | " | red |
| " | 3-$CH_3$ | " | —$C_2H_4CN$ | 2-$OCH_3$ | " | violet |
| " | 5-$CH_3$-2-$OCH_3$ | —$C_2H_5$ | —$C_2H_5$ | —H | " | blue-red |
| " | 2-$OCH_3$-4,6-di-$CH_3$ | —$C_3H_7$ | —$C_3H_7$ | " | " | claret |
| " | 3-$OCH_3$ | —$CH_2C_6H_5$ | —$CH_2C_6H_5$ | " | " | violet |

-continued

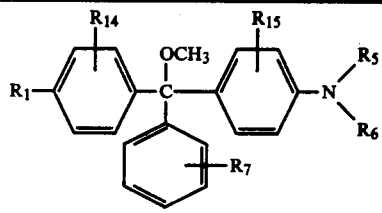

| $R_1$ | $R_7$ | $R_5$ | $R_6$ | $R_{14}$ | $R_{15}$ | Colour shade on contact with silica gel |
|---|---|---|---|---|---|---|
| —$C_3H_7$ | " | i-$C_3H_7$ | i-$C_3H_7$ | " | " | red |
| —$OCH_3$ | 2,5-di-$OCH_3$ | —$C_4H_9$ | —$C_4H_9$ | —H | —H | red-violet |
| " | 3-$OCH_3$ | —$C_2H_5$ | —$C_2H_5$ | 3-$OCH_3$ | " | blue-red |
| " | 2-$OCH_3$ | " | " | 2,3-benzo | " | red-violet |
| " | 4-$OCH_3$ | —$CH_3$ | p-$C_6H_4OC_2H_5$ | —H | " | red-blue |
| " | " | " | —$CH_3$ | " | 2-Cl | Corinth blue |
| " | " | —$C_2H_5$ | —$C_2H_5$ | " | " | violet-grey |
| " | " | " | —$CH_2C_6H_5$ | " | 2-$CH_3$ | Corinth blue |
| —$OC_2H_5$ | 4-$OC_2H_5$ | —$CH_3$ | —$C_6H_5$ | " | —H | claret |
| —$OCH_3$ | 4-$OCH_3$ | " | " | 2-Cl | " | violet |
| " | 4-$OCH_3$ | —$C_2H_4OCH_3$ | —$C_2H_4OCH_3$ | 2-$CH_3$ | " | blue-red |
| " | " | —$CH_3$ | —$C_2H_4OH$ | 3-$CH_3$ | " | " |
| " | 4-$OCH_3$-3-$CH_3$ | —$C_3H_7$ | —$C_3H_7$ | " | " | claret |
| " | 4-$OCH_3$ | —$C_4H_9$ | —$C_4H_9$ | 3,5-di-$CH_3$ | " | blue-red |
| " | " | —$CH_3$ | —$C_6H_5$ | 2-$OCH_3$ | " | violet |
| " | 4-$SCH_3$ | —$C_4H_9$ | —$C_4H_9$ | —H | " | claret |
| —$OC_2H_5$ | 4-$SC_2H_5$ | —H | i-$C_3H_7$ | " | " | blue-red |

| $R_1$ | $R_7$ | $R_{14}$ | $R_{15}$ $\diagdown N \diagup R_5 / R_6$ | | |
|---|---|---|---|---|---|
| —$OCH_3$ | —H | —H | N-phenylmorpholine | | ruby |
| " | " | " | 1,2,3,3-tetramethylindoline | | red |
| " | " | " | 1-chloroacetyl-2-methylindoline | | red |
| " | " | " | 1-phenyl-3-methylpyrazoline | | violet |
| " | " | " | 1,3-diphenylpyrazoline | | red-blue |
| " | 2-$CH_3$ | " | " | | red-blue |
| " | —H | 2-$OCH_3$ | " | | dark blue |
| " | " | 2-$CH_3$ | " | | red-blue |
| —$OC_4H_9$ | 2-$CH_3$ | —H | " | | blue-violet |
| —$OC_2H_5$ | 3-$CH_3$ | " | N-phenylmorpholine | | violet |
| " | " | " | 1,3-diphenylpyrazoline | | red-blue |
| —$OCH_3$ | 2,4,5-tri-$CH_3$ | " | 1,2-dimethylindoline | | red |
| " | 4-$OCH_3$ | " | 1,3-diphenylpyrazoline | | dark blue |
| " | " | " | 1-phenyl-3-methylpyrazoline | | Corinth blue |
| —$OCH_3$ | 4-$OCH_3$ | —H | N-phenylmorpholine | | claret |
| " | 2-$OCH_3$ | " | 1,3-diphenylpyrazoline | | red-blue |
| " | 4-3 | " | " | | greenish-tinged dark blue |
| " | " | " | 1-phenyl-3-methylpyrazoline | | Corinth blue |
| " | " | " | 1-methyl-tetrahydroquinoline | | red-blue |

| $R_1$ | $R_{14}$ | $R_5$ | $R_6$ | $R_{15}$ | $R_9$ | $R_{10}$ | $R_{16}$ | Colour shade on contact with silica gel |
|---|---|---|---|---|---|---|---|---|
| —H | —H | —$CH_3$ | —$C_6H_5$ | —H | —$C_6H_5$ | —$CH_3$ | —H | green |

-continued

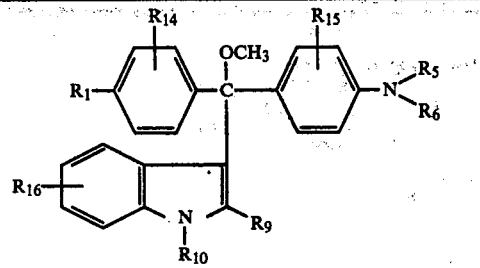

| R₁ | R₁₄ | R₅ | R₆ | R₁₅ | R₉ | R₁₀ | R₁₆ | Colour shade on contact with silica gel |
|---|---|---|---|---|---|---|---|---|
| " | " | " | " | " | —CH₃ | —H | " | blue |
| " | " | " | " | " | —C₆H₅ | —CH₃ | 5-OCH₃ | blue-green |
| " | " | " | " | " | —CH₃ | —C₂H₅ | 6-CH₃ | blue green |
| " | " | " | " | " | —C₆H₅ | —C₂H₄CN | —H | blue green |
| " | " | " | " | " | " | —CH₃ | " | blue |
| " | " | " | " | " | —CH₃ | " | " | blue-violet |
| " | " | —C₂H₅ | —C₂H₅ | " | —C₆H₅ | —H | " | green-blue |
| —CH₃ | " | —CH₃ | —CH₃ | " | —CH₃ | —CH₃ | " | violet |
| —H | 3-Cl | " | " | " | —C₆H₅ | " | " | blue |
| —H | 2-Cl | —C₂H₅ | —C₂H₅ | —H | —C₆H₅ | —CH₃ | —H | blue |
| " | 3-Cl | " | " | " | " | " | " | green-blue |
| —CH₃ | —H | —CH₃ | —CH₃ | " | —CH₃ | —H | " | claret |
| —H | 2,5-di-Cl | " | " | " | —C₆H₅ | " | " | blue |
| —NO₂ | 3-CH₃ | " | " | " | " | —CH₃ | " | blue-green |
| —H | —H | —C₂H₄CN | " | " | " | " | " | blue |
| —CH₃ | " | p-C₆H₄OC₂H₅ | " | " | —CH₃ | " | " | blue |
| —H | 3-Cl | " | " | " | —C₆H₅ | " | " | blue-green |
| —OCH₃ | —H | —CH₃ | " | " | " | —H | " | black |
| —CH₃ | —H | —C₆H₅ | —CH₃ | —H | —CH₃ | —CH₃ | —H | blue |
| —H | 3-CH₃ | —C₂H₅ | —C₂H₅ | " | —C₆H₅ | —H | " | blue-green |
| —CH₃ | 3-NO₂ | —CH₃ | —CH₃ | " | —CH₃ | " | " | dark blue |
| —H | —H | —C₃H₇ | —C₃H₇ | " | " | —CH₃ | " | red-blue |
| " | " | —C₂H₅ | —C₂H₅ | " | " | —C₂H₅ | " | red-blue |
| " | 2,3-benzo | —CH₃ | —CH₃ | " | —C₆H₅ | —CH₃ | " | grey |
| " | —H | —C₂H₅ | —C₂H₅ | " | —CH₃ | —C₂H₄CN | " | reddish-tinged dark blue |
| —H | —H | —C₂H₅ | —C₂H₅ | —H | —C₆H₅ | —C₂H₄CN | —H | dark blue |
| " | " | " | " | " | " | —C₂H₅ | 7-Cl | blue-grey |
| " | " | " | " | " | " | —CH(C₂H₅)(CH₃) | —H | green-blue |
| " | " | —CH₃ | —CH₃ | 3-Br | —CH₃ | —CH₂C₆H₅ | " | grey-green |
| " | " | " | " | 2-CH₃ | " | —CH₃ | " | red-violet |
| " | " | —H | —H | —H | " | " | " | green-blue |
| " | " | —CH₃ | —C₂H₄Cl | 2-CH₃ | " | " | " | blue-red |
| " | " | " | " | " | " | " | " | red-blue |
| " | " | —CH₂—C₆H₅ | " | " | " | " | " | blue |
| " | " | —C₂H₅ | —C₂H₅ | 2-OC₂H₅ | " | " | " | red-blue |
| —CH₃ | " | " | —CH₂—C₆H₅ | —H | " | " | " | violet |
| —H | " | " | " | " | " | " | " | red-blue |
| " | " | —C₆H₅ | —CH₃ | 2,3-benzo | —C₆H₅ | " | " | blue-green |
| " | 2-OCH₃ | —C₂H₅ | —C₂H₅ | —H | —CH₃ | " | " | blue |
| " | 2-CH₃ | " | " | " | —C₆H₅ | " | " | blue |
| —H | 3-OCH₃ | —CH₃ | —C₆H₅ | —H | —CH₃ | —CH₃ | —H | blue |
| —C₆H₅ | —H | " | " | " | " | " | " | grey |
| —H | " | —H | 2-C₆H₄CH₃ | " | —C₆H₅ | " | " | green |
| —OCH₃ | " | —CH₃ | —CH₃ | " | —CH₃ | " | " | claret |
| " | " | " | " | " | —C₆H₅ | " | " | grey |
| " | " | —C₂H₅ | —C₂H₅ | " | —CH₃ | " | " | claret |
| " | " | " | " | " | —C₆H₅ | " | " | grey-green |
| " | " | 4-C₆H₄OC₂H₅ | —CH₃ | " | —CH₃ | " | " | grey |
| " | " | —C₆H₅ | " | " | " | " | " | grey-brown |
| " | " | " | " | " | —C₆H₅ | " | " | green-grey |
| " | " | —C₂H₅ | —C₂H₅ | " | —CH₃ | —H | " | red-brown |
| " | " | " | " | " | —C₆H₅ | " | " | grey |
| " | " | —CH₃ | —C₆H₅ | " | —CH₃ | " | " | claret |
| " | " | " | " | " | —C₆H₅ | " | " | grey |
| " | " | " | —CH₃ | " | " | —C₂H₄CN | " | claret |
| —H | —H | —H | —H | —H | —CH₃ | —C₂H₅ | —H | claret |
| " | " | Phenylmorpholine | | | —C₆H₅ | —CH₃ | " | blue-green |
| " | " | " | | | —CH₃ | " | " | red-blue |

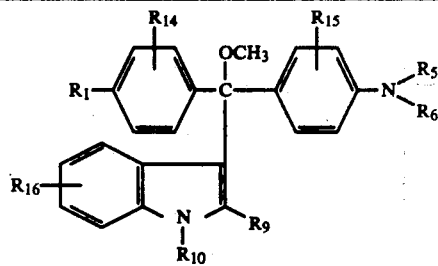

| $R_1$ | $R_{14}$ | $R_5$ | $R_6$ | $R_{15}$ | $R_9$ | $R_{10}$ | $R_{16}$ | Colour shade on contact with silica gel |
|---|---|---|---|---|---|---|---|---|
| —OCH$_3$ | " | | " | | —C$_6$H$_5$ | " | " | grey |
| —H | " | | 1-Phenyl-4-hydroxyethyl-piperazine | | " | " | " | green-blue |
| " | " | | Piperidine | | " | " | " | green-blue |
| " | " | | 1,2,3,3-Tetramethylindoline | | " | " | " | red-blue |
| " | " | | 1-Chlorethyl-2-methylindoline | | " | " | " | red-blue |

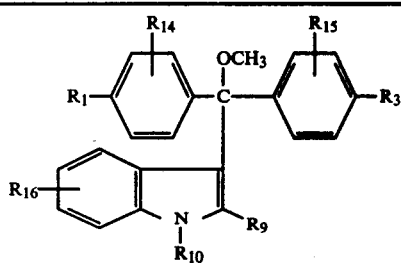

| $R_1$ | $R_{14}$ | $R_3$ | $R_{15}$ | $R_9$ | $R_{10}$ | $R_{16}$ | Colour shade on contact with silica gel |
|---|---|---|---|---|---|---|---|
| —SCH$_3$ | —H | —OCH$_3$ | —H | —C$_6$H$_5$ | —C$_2$H$_5$ | 6-CH$_3$ | claret |
| —SC$_2$H$_5$ | " | " | " | —CH$_3$ | —H | —H | yellow-red |
| —OCH$_3$ | " | " | " | —C$_6$H$_5$ | —CH$_3$ | " | yellow-red |

If the process is carried out in the manner indicated in Example 3, instead of the examples indicated in Examples 1 and 2 and in the tables on pages 14–25, the corresponding products of the formulae

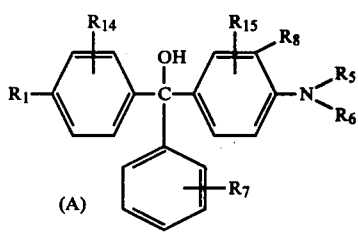

(A)

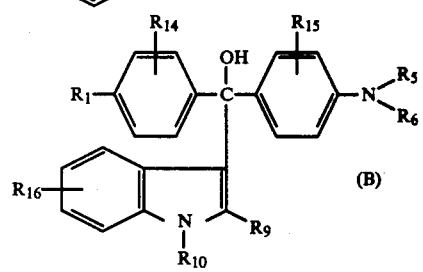

(B)

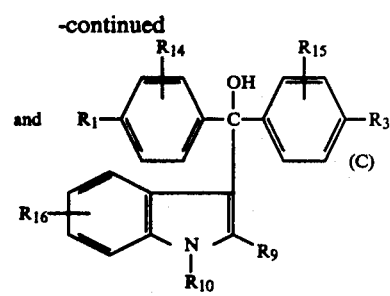

and (C)

are obtained, and, in the case where $R_{10}$=H, the colour-forming agents

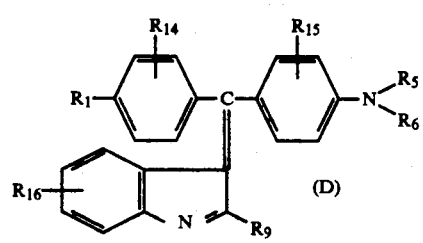

(D)

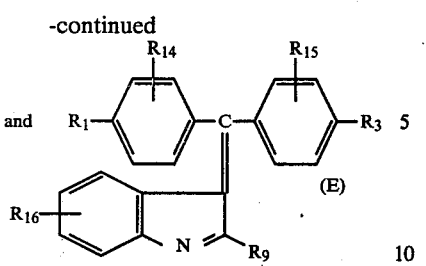

are already obtained during the preparation, H₂O being split off.

On silica gel, the colour-forming agents of the formulae A, B, C, D and E thus prepared develop the same colour shade as is indicated in the above examples in the case of the corresponding carbinol bases.

EXAMPLE 4

2 g of the colour-forming agent described in Example 1 are dissolved in 48 g of chlorinated biphenyl at 60°–70° C.

7.5 g of pigskin gelatine are dissolved in 60 g of distilled water at 60°–70° C.

The colour-forming agent solution, cooled to about 50° C., is emulsified in the latter solution at about 50° C., during which an oil droplet size of 1–10 μm diameter must be achieved. The resulting emulsion is slowly added to a solution, warmed to about 40° C., of 7.5 g of gum arabic in 60 g of water at about 40° C., whilst stirring. The pH value is adjusted to about 7 with 10% strength NaOH. The mixture is then slowly diluted with 190 g of distilled water having a temperature of 35°–40° C.

Thereafter, 50 g of a 2% strength aqueous solution of Mowiol 26/88 (polyvinyl alcohol from Hoeschst AG) is added to the mixture in the range from 30°–35° C. The pH value is then adjusted to 5.2 by adding aqueous 10% strength acetic acid dropwise, and coacervation is thus started. The mixture is allowed to cool to about 20° C. in the course of 30–45 minutes, whilst stirring continuously. At this point in time, the success of the coacervation can be easily examined microscopically.

The mixture is then cooled to 5°–10° C., 5 g of glutardialdehyde are added in the weakly acid pH range and the hardening is allowed to continue for several hours, whilst stirring the mixture continuously.

Thereafter, the capsules can be isolated, for example by spray-drying.

The microcapsules thus prepared are applied in an amount of 4 g/qm to a carrier paper weighing 40 g/qm.

On combination with a customary receiving paper, red-violet written images are produced when an impression is made.

EXAMPLE 5

2 g of the colour-forming agent described in Example 3 are dissolved in 48 g of dibutyl phthalate at 60°–70° C. If the further procedure followed is as in Example 4, on combination with a customary receiving paper, black written images are obtained when an impression is made.

EXAMPLE 6

2 g of the colour-forming agent described in Example 2 are dissolved in 48 g of dimethylnapthalene at 60°–70° C. If the further procedure followed is as in Example 4, on combination with a customary receiving paper, blue written images are obtained when an impression is made.

EXAMPLE 7

2 g of the colour-forming agent given in line 8 of the table on page 12 are dissolved in 48 g of dimethylnaphthalene at 60°–70° C. If the further procedure followed is as in Example 4, on combination with a receiving paper, red written images are obtained when an impression is made.

EXAMPLE 8

A dispersion of 1 g of the carbinol ether described in Example 2 and 55 g of an aqueous 8% strength polyvinyl alcohol solution is prepared in a ball mill.

A second dispersion contains 80 g of 2,2-bis-(4-hydroxyphenyl)-propane and 450 g of an aqueous 8% strength polyvinyl alcohol solution.

The dispersion of the colour-forming agent is mixed with that of the developer in the ratio 1:20 and this mixture is applied to a sheet. Using a heated pen, blue writing is obtained on the dried sheet.

We claim:

1. Pressure-sensitive recording material, characterised in that it contains a substrate coated with an acidic color developer and a substrate coated with a colour-forming agent of the formula

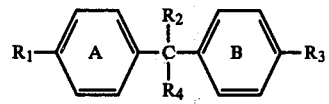

wherein $R_1$ denotes hydrogen or a non-ionic radical which is free from amino groups, $R_2$ denotes hydroxyl, alkylamino, dialkylamino, acylamino, aralkylamino, arylamino, a saturated heterocyclic radical, alkoxy, alkenyloxy, aralkoxy, cycloalkoxy, aryloxy, acyloxy or a direct bond to $R_4$, $R_3$ denotes hydroxyl, alkoxy, aralkoxy, alkenyloxy, cycloalkoxy, aryloxy, alkylthio, arylthio or a radical of the formula

$R_5$ and $R_6$ independently of one another denote hydrogen, alkyl, aralkyl, cycloalkyl or aryl or, together with the nitrogen atom, form a ring, or $R_5$ forms a ring with the ring B in the o-position relative to the nitrogen atom, and $R_4$ denotes an aryl radical which is free from amino groups or a heterocyclic radical, and further rings can be fused to the rings A, B and $R_4$ and the cyclic and acylic radicals and the rings A and B can contain non-ionic substituents, said color forming agent being dissolved or dispersed in a non-volatile organic solvent.

2. Recording material according to claim 1, characterised in that it contains a colour-forming agent of the formula

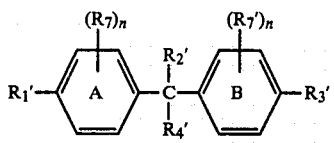

wherein
$R_1'$ denotes hydrogen; hydroxyl; $C_1$-$C_6$-alkoxy; $C_2$-$C_6$-alkenyloxy; cyclohexyloxy; cyclopentyloxy; benzyloxy, phenylethoxy, phenyloxy, naphthyloxy, phenylthio or naphthylthio which are optionally substituted by $C_1$-$C_4$-alkyl, $C_1$-$C_4$-alkoxy or halogen; or $C_1$-$C_6$-alkylthio, $R_2'$ denotes hydroxyl; $C_1$-$C_{12}$-alkyl- or dialkylamino; $C_1$-$C_4$-alkylcarbonylamino; benzylamino, phenylethylamino, phenylamino, naphthylamino, phenylsulphonylamino or benzoylamino which are optionally substituted by $C_1$-$C_4$-alkyl, $C_1$-$C_4$-alkoxy or halogen; morpholino, piperidino or pyrrolidino which are optionally substituted by $C_1$-$C_4$-alkyl; $C_1$-$C_{12}$-alkoxy; $C_2$-$C_{12}$-alkenyloxy; $C_1$-$C_4$-alkoxycarbonyloxy; benzyloxy, phenylethoxy, phenyloxy, naphthyloxy, benzoyloxy, phenylsulphonyloxy or phenylsulphinyloxy which are optionally substituted by $C_1$-$C_4$-alkyl, $C_1$-$C_4$-alkoxy or halogen; cyclohexyloxy; cyclopentyloxy or a direct bond to $R_4'$, $R_3'$ denotes hydroxyl; $C_1$-$C_6$-alkoxy; $C_2$-$C_6$-alkenyloxy, cyclohexyloxy; cyclopentyloxy; benzyloxy, phenylethoxy, phenyloxy, naphthyloxy, phenylthio or naphthylthio which are optionally substituted by $C_1$-$C_4$-alkyl, $C_1$-$C_4$-alkoxy or halogen; $C_1$-$C_6$-alkylthio or a radical of the formula

$R_5'$ and $R_6'$ independently of one another denote hydrogen; $C_1$-$C_6$-alkyl which is optionally substituted by $C_1$-$C_4$-alkoxy, $C_1$-$C_4$-alkylcarbonyloxy, hydroxyl, halogen or cyano; benzyl, phenylethyl, phenyl or naphthyl which are optionally substituted by $C_1$-$C_4$-alkyl, $C_1$-$C_4$-alkoxy or halogen; cyclopentyl or cyclohexyl, or $R_5'$ and $R_6'$, together with the nitrogen atom, denote a pyrrolidine, pyrazoline, piperidine or morpholine ring or, $R_5'$, together with the nitrogen atom and ring B, denotes an indoline or tetrahydroquinoline ring, it being possible for the rings mentioned to be substituted by methyl or phenyl, $R_4'$ denotes a radical of the formula

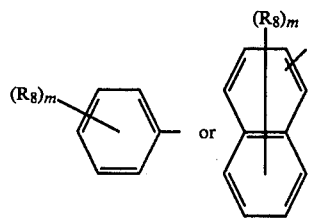

in which
m=1-4 and $R_8$=hydrogen, $C_1$-$C_4$-alkyl or $C_1$-$C_4$-alkoxy; halogen; carboxamide; sulphonamide; cyano; nitro; halogen; $C_1$-$C_4$-alkylthio; $C_1$-$C_4$-alkylsulphonyl; $C_1$-$C_4$-alkylcarbonyl; $C_1$-$C_4$-alkoxycarbonyl; or benzyl, phenylethyl, benzyloxy, phenylethoxy, phenyloxy, cyclopentyloxy, cyclohexyloxy, phenylthio, benzylsulphonyl, phenylethylsulphonyl or phenylsulphonyl which are optionally substituted by $C_1$-$C_4$-alkyl, $C_1$-$C_4$-alkoxy or halogen, or $R_4'$ denotes an indole, triazole, furane, thiophene, pyridine, pyrazolone, thiazine, oxazine, benzothiophene, indazole, benzothiazole, quinoline, phenothiazine and phenoxazine radical, which in turn can be substituted by 1-2 radicals, such as $C_1$-$C_6$-alkyl, phenyl, benzyl or $C_1$-$C_4$-alkoxy which are optionally substituted by $C_1$-$C_4$-alkoxy, cyano or halogen, $R_7$ and $R_7'$ denote hydrogen, $C_1$-$C_4$-alkyl, $C_1$-$C_4$-alkoxy, halogen or nitro and n and n' denote 1-4, and wherein
the rings A and B can be fused, in the 2,3-position, to a benzene ring.

3. Recording material according to claim 2, characterised in that it contains a colour-forming agent of the formula

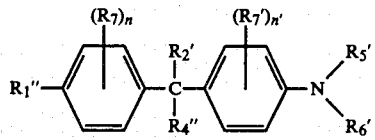

wherein
$R_1''$ represents hydroxyl; $C_1$-$C_4$-alkoxy; $C_1$-$C_4$-alkylthio; cyclohexyloxy; cyclopentyloxy; or benzyloxy, phenylethoxy, phenyloxy, naphthyloxy, phenylthio or naphthylthio which are optionally substituted by $C_1$-$C_4$-alkyl, $C_1$-$C_4$-alkoxy or halogen, $R_4''$ represents a radical of the formula

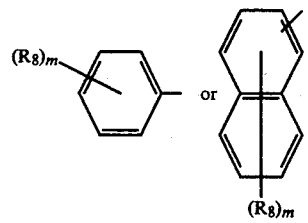

and,

4. Recording material according to claim 2, characterised in that it contains a colour-forming agent of the formula

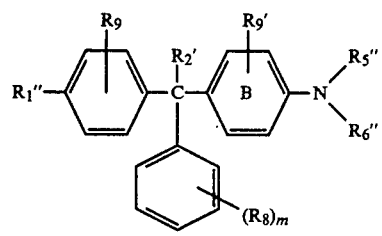

wherein $R_5''$ and $R_6''$ independently of one another denotes hydrogen; $C_1$-$C_4$-alkyl; cyanoethyl; hydroxyethyl; acetoxyethyl; $C_1$-$C_4$-alkoxyethyl; or benzyl or phenyl which are optionally substituted by methyl, ethyl, methoxy or ethoxy, or $R_5''$ and $R_6''$, together with the nitrogen atom, form a pyrrolidine, piperidine, morpholine, pyrazoline or piperazine ring which is optionally substituted by methyl and/or phenyl, $R_9$ and $R_9'$ represents hydrogen, methyl, ethyl, methoxy, ethoxy or chlorine, or $R_5''$ and $R_9'$, together with ring B and the nitrogen atom, form an indoline or tetrahydroquinoline ring which is optionally substituted by $C_1$-$C_4$-alkyl.

5. Recording material according to claim 1 characterized in that it contains a colour-forming agent of the formula

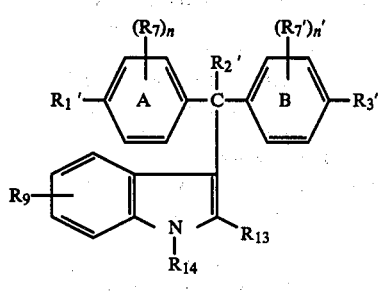

wherein $R_1'$ denotes hydrogen; hydroxyl; $C_1$-$C_6$-alkoxy; $C_2$-$C_6$-alkenyloxy, cyclohexyloxy, cyclopentyloxy; benzyloxy, phenylethoxy, phenyloxy, naphthyloxy, phenylthio or naphthylthio which are optionally substituted by $C_1$-$C_4$-alkyl, $C_1$-$C_4$-alkoxy or halogen; or $C_1$-$C_6$-alkylthio, $R_2'$ denotes hydroxyl; $C_1$-$C_{12}$-alkyl- or dialkylamino; $C_1$-$C_4$-alkylcarbonylamino; benzylamino, phenylethylamino, phenylamino, naphthylamino, phenylsulphonylamino or benzoylamino which are optionally substituted by $C_1$-$C_4$-alkyl, $C_1$-$C_4$-alkoxy or halogen; morpholino, piperidino or pyrrolidino which are optionally substituted by $C_1$-$C_4$-alkyl; $C_1$-$C_{12}$-alkoxy; $C_2$-$C_{12}$-alkenyloxy; $C_1$-$C_4$-alkoxycarbonyloxy; benzyloxy, phenylethoxy, phenyloxy, naphthyloxy, benzoyloxy, phenylsulphonyloxy or phenylsulphinyloxy which are optionally substituted by $C_1$-$C_4$-alkyl, $C_1$-$C_4$-alkoxy or halogen; cyclohexyloxy; cyclopentyloxy or a direct bond to the indole radical bearing the $R_{13}$ and $R_{14}$ substituents.

$R_3'$ denotes hydroxyl; $C_1$-$C_6$-alkoxy; $C_2$-$C_6$-alkenyloxy, cyclohexyloxy; cyclopentyloxy; benxyloxy, phenylethoxy, phenyloxy, naphthyloxy, phenylthio or naphthylthio which are optionally substituted by $C_1$-$C_4$-alkyl, $C_1$-$C_4$-alkoxy or halogen; $C_1$-$C_6$-alkylthio or a radical of the formula

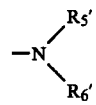

$R_5'$ and $R_6'$ independently of one another denote hydrogen; $C_1$-$C_6$-alkyl which is optionally substituted by $C_1$-$C_4$-alkoxy, $C_1$-$C_4$-alkylcarbonyloxy, hydroxyl, haogen or cyano; benzyl, phenylethyl, phenyl or naphthyl which are optionally substituted by $C_1$-$C_4$-alkyl, $C_1$-$C_4$-alkoxy or halogen; cyclopentyl or cyclohexyl, or $R_5'$ and $R_6'$, together with the nitrogen atom, denote a pyrrolidine, pyrazoline, piperidine or morpholine ring, or, $R_5'$, together with the nitrogen atom and ring B, denotes an indoline or tetrahydroquinoline ring, it being possible for the rings mentioned to be substituted by methyl or phenyl, $R_7$ and $R_7'$ denote hydrogen, $C_1$-$C_4$-alkyl, $C_1$-$C_4$-alkoxy, halogen or nitro, $R_9$ represents hydrogen, methyl, ethyl, methoxy, ethoxy or chlorine, or $R_{13}$ represents $C_1$-$C_4$-alkyl or phenyl and $R_{14}$ represents hydrogen; $C_1$-$C_{22}$-alkyl which is optionally substituted by cyano, chlorine or hydroxyl; $C_2$-$C_4$-alkenyl; cyclohexyl; or phenyl or benzyl which are optionally substituted by methyl, ethyl, methoxy, ethoxy or chlorine, and the rings A and B can be fused, in the 2,3-position, to a benzene ring.

6. Recording material, according to claim 5 characterised in that it contains a colour-forming agent of the formula

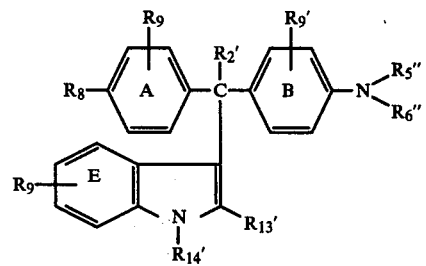

wherein $R_5''$ and $R_6''$ independently of one another denotes hydrogen; $C_1$-$C_4$-alkyl; cyanoethyl; hydroxyethyl; acetoxyethyl; $C_1$-$C_4$-alkoxyethyl; or benzyl or phenyl which are optionally substituted by methyl, ethyl, methoxy or ethoxy, or $R_5''$ and $R_6''$, together with the nitrogen atom, form a pyrrolidine, piperidine, morpholine, pyrazoline or piperazine ring which is optionally substituted by methyl and/or phenyl, $R_8$ = hydrogen, $C_1$-$C_4$-alkyl or $C_1$-$C_4$alkoxy; halogen; carboxamide; sulphonamide; cyano; nitro; halogen; $C_1$-$C_4$-alkylthio; $C_1$-$C_4$-alkylsulphonyl; $C_1$-$C_4$-alkylcarbonyl; $C_1$-$C_4$-alkoxycarbonyl; or benzyl, phenylethyl, benzyloxy, phenylethoxy, phenyloxy, cyclopentyloxy, cyclohexyloxy, phenylthio, benzylsulphonyl, phenylethylsulphonyl or phenylsulphonyl which are optionally substituted by $C_1$-$C_4$-alkyl, $C_1$-$C_4$-alkoxy or halogen, $R_9$ and $R_9'$ represents hydrogen, methyl, ethyl, methoxy, ethoxy or chlorine, or $R_5''$ and $R_9''$, together with ring B and the nitrogen atom, form an indoline or tetrahydroquinoline ring which is optionally substituted by $C_1$-$C_4$-alkyl, $R_{13}'$ represents methyl, ethyl or phenyl and $R_{14}'$ represents hydrogen or $C_1$-$C_4$-alkyl.

7. Recording material according to claim 1, characterized in that it contains a colour-forming agent of the formula

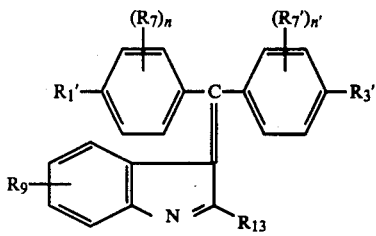

$R_1'$ denotes hydrogen; hydroxy; $C_1$–$C_6$-alkoxy; $C_2$–$C_6$-alkenyloxy; cyclohexyloxy; cyclopentyloxy; benzyloxy, phenylethoxy, phenyloxy, naphthyloxy, phenylthio or naphthylthio which are optionally substituted by $C_1$–$C_4$-alkyl, $C_1$–$C_4$-alkoxy or halogen; or $C_1$–$C_6$-alkylthio, $R_3'$ denotes hydroxyl; $C_1$–$C_6$-alkoxy; $C_2$–$C_6$-alkenyloxy, cyclohexyloxy; cyclopentyloxy; benzyloxy, phenylethoxy, phenyloxy, naphthyloxy, phenylthio or naphthylthio which are optionally substituted by $C_1$–$C_4$-alkyl, $C_1$–$C_4$-alkoxy or halogen; $C_1$–$C_6$-alkylthio or a radical of the formula

$R_5'$ and $R_6'$ independently of one another denote hydrogen; $C_1$–$C_6$-alkyl which is optionally substituted by $C_1$–$C_4$-alkoxy, $C_1$–$C_4$-alkylcarbonyloxy, hydroxyl, halogen or cyano; benzyl, phenylethyl, phenyl or naphthyl which are optionally substituted by $C_1$–$C_4$-alkyl, $C_1$–$C_4$-alkoxy or halogen; cyclopentyl or cyclohexyl, or $R_5'$ and $R_6'$, together with the nitrogen atom, denote a pyrrolidine, pyrazoline, piperidine or morpholine $R_7$ and $R_7'$ denote hydrogen, $C_1$–$C_4$-alkyl, $C_1$–$C_4$-alkoxy, halogen or nitro, n and n' denote 1–4, $R_9$ represents hydrogen, methyl, ethyl, methoxy, ethoxy or chlorine, and $R_{13}$ represents $C_1$–$C_4$-alkyl or phenyl.

8. Recording material according to claim 7, characterized in that it contains a colour-forming agent of the formula

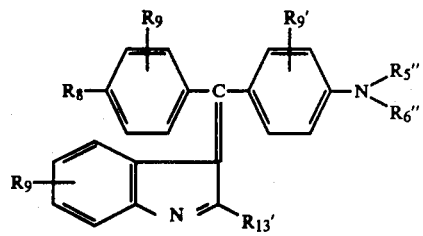

wherein $R_5''$ and $R_6''$ independently of one another denotes hydrogen; $C_1$–$C_4$-alkyl; cyanoetyl; hydroxyethyl; acetoxyethyl; $C_1$–$C_4$-alkoxyethyl; or benzyl or phenyl which are optionally substituted by methyl, ethyl, methoxy or ethoxy, or $R_5''$ and $R_6''$, together with the nitrogen atom, form a pyrrolidine, piperidine, morpholine, pyrazoline or piperazine ring which is optionally substituted by methyl and/or phenyl, $R_8$ = hydrogen, $C_1$–$C_4$-alkyl or $C_1$–$C_4$-alkoxy, halogen; carboxamide; sulphonamide; cyano; nitro; halogen;
$C_1$–$C_4$-alkylthio; $C_1$–$C_4$-alkylsulphonyl; $C_1$–$C_4$-alkylcarbonyl; $C_1$–$C_4$-alkoxycarbonyl; or benzyl, phenylethyl, benzyloxy, phenylethoxy, phenyloxy, cyclopentyloxy, cyclohexyloxy, phenylthio, benzylsulphonyl, phenylethylsulphonyl or phenylsulphonyl which are optionally substituted by $C_1$–$C_4$-alkyl, $C_1$–$C_4$-alkoxy or halogen, or $R_9'$ represents hydrogen, methyl, ethyl methoxy, ethoxy or chlorine, $R_5''$ and $R_9'$, together with ring B and the nitrogen atom, form an indoline or tetrahydroquinoline ring which is optionally substituted by $C_1$–$C_4$-alkyl, and $R_{13}'$ represents methyl, ethyl or phenyl.

9. Recording material according to claim 6, characterized in that $R_8$ represents methyl, hydrogen, phenyloxy, benzyloxy or $C_1$–$C_4$-alkoxy.

10. Recording material according to claim 8, characterized in that $R_8$ represents methyl, hydrogen, phenoxy, benzyloxy or $C_1$–$C_4$-alkoxy.

* * * * *